F. J. BAKER.
DIFFERENTIAL GEARING.
APPLICATION FILED JULY 11, 1917.
1,258,177.
Patented Mar. 5, 1918.
2 SHEETS—SHEET 2.
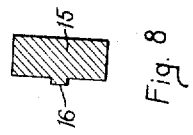
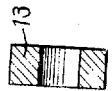
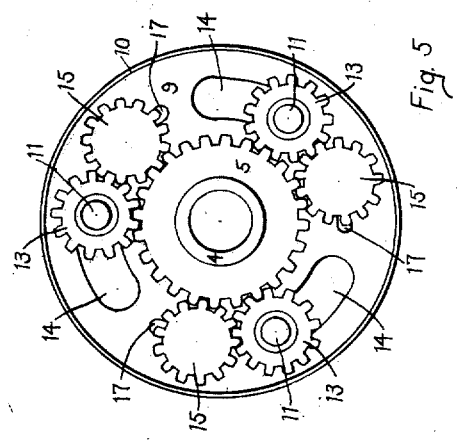
Witness
Elwood H. Herlig
Inventor
Frederick J. Baker,
By Howard L. Smith,
His Attorney

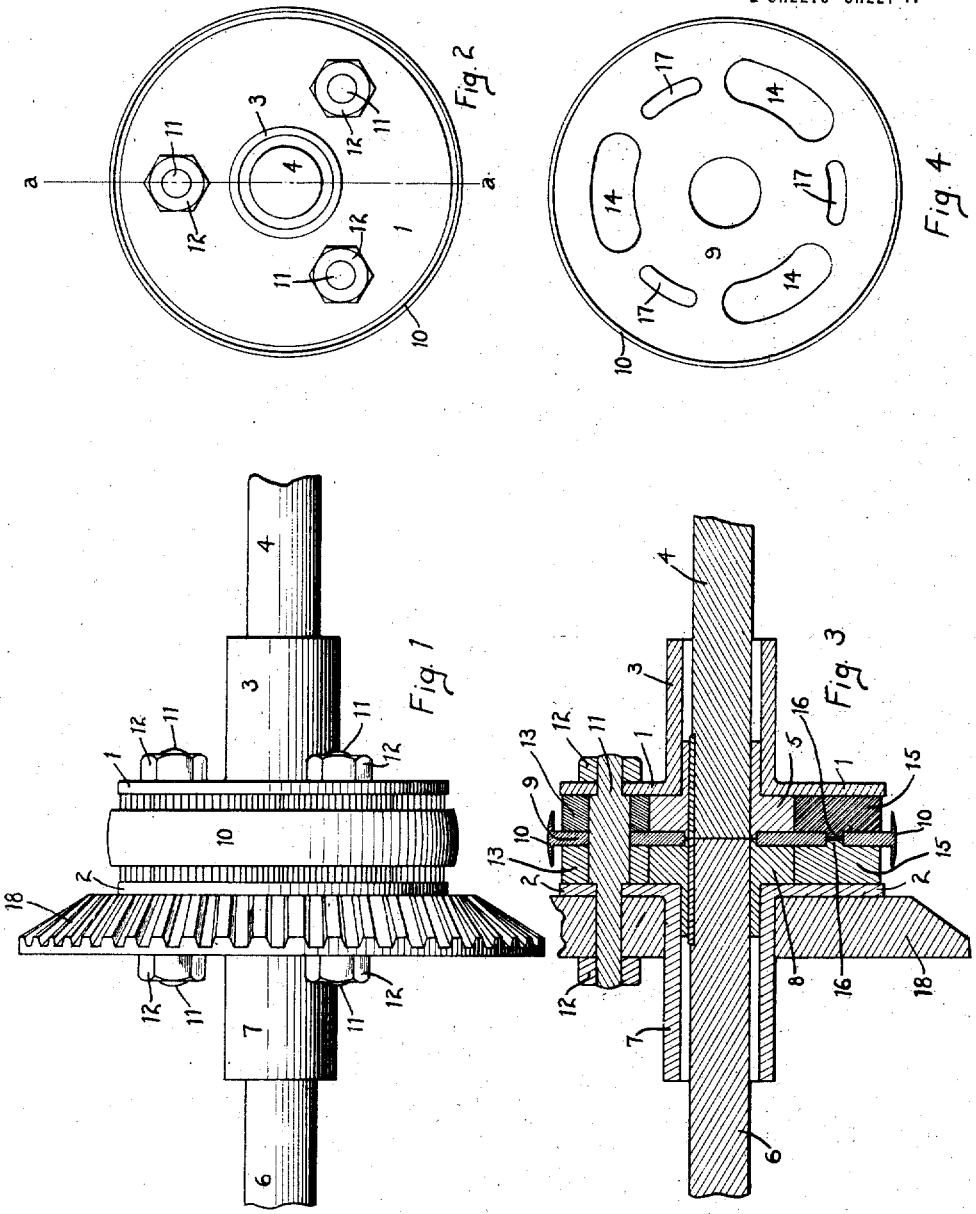

UNITED STATES PATENT OFFICE.

FREDERICK J. BAKER, OF DAYTON, OHIO.

DIFFERENTIAL GEARING.

1,258,177.  Specification of Letters Patent.  Patented Mar. 5, 1918.

Application filed July 11, 1917. Serial No. 179,832.

*To all whom it may concern:*

Be it known that I, FREDERICK J. BAKER, a citizen of the United States, residing at Dayton, in the county of Montgomery and State of Ohio, have invented certain new and useful Improvements in Differential Gearing, of which the following is a specification.

This invention relates to new and useful improvements in differential gearing.

One of the principal objects of my invention is to provide for all types of automobiles, a differential gearing which prevents the divided driving axles or shafts from turning in opposite directions. For instance, when an automobile is turning a corner, one driving wheel is apt to move in a direction opposite to the movement of the other one and thereby injure or strain the driving mechanism.

A further object of my invention is to provide a differential gearing which will materially reduce the dangers due to skidding, and which will also assist an automobile in negotiating rough and slippery roads.

Other important and incidental objects will be set forth in the following specification and particularly pointed out in the subjoined claims.

The preferred form of embodiment of my invention is illustrated in the accompanying drawings, of which Figure 1 is a side elevational view of my improved differential gearing. Fig. 2 is an end view, with bevel gear removed. Fig. 3 is a sectional view taken on the line a—a of Fig. 2. Fig. 4 is a plan view of the dividing plate or spider between the gears and pinions. Fig. 5 is a plan view of one set of gears after one end of the differential casing has been removed. Fig. 6 is a plan view of one of the studs or spindles which extends between the sections of the differential casing. Fig. 7 is a sectional view of one of the gears mounted on said spindles. And Fig. 8 is a sectional view of one of the floating pinions.

Throughout the specification and drawings, similar reference characters denote corresponding parts.

In a detailed description of the preferred form of embodiment of my invention, the numeral 1 designates one section of the differential casing and 2 the opposite section. Suitably journaled in the outwardly projecting tubular portion 3 of the casing section 1 is an axle shaft 4 on the inner end of which a gear 5 is fast. A companion axle shaft 6 is suitably journaled in the tubular extension 7 of the casing section 2. To the inner end of the axle shaft 6 there is keyed a gear 8 which is separated from the gear 5 by an oscillating spider or disk plate 9 which has an annular retaining rim or band 10. (See Figs. 1 and 3.)

Extending through the disk portions of the casing sections 1 and 2, near the outer circumferential edges thereof, are the threaded ends of spindles or studs 11, three of which are preferably employed in my present invention. (See Figs. 1, 2 and 3.) The threaded ends of these spindles 11, after being passed through holes in the faces of the casing sections 1 and 2, receive nuts 12 for the purpose of uniting said sections, sufficient space being left between them to accommodate the disk plate 9, the gears 5 and 8, and the following gears and pinions.

Loosely mounted upon one of the spindles 11, one on each side of the disk plate 9, are small gears 13, three of which are in mesh with the gear 5 and three in mesh with the gear 8. (See Figs. 1, 3 and 5.) The middle portion of each of the spindles 11, or that portion of a spindle between each of the gears 13 thereon, loosely passes through an arcuate slot 14 provided in the disk plate 9. There are three of these slots 14 circumferentially arranged around the axis of the disk plate 9, for a purpose to be hereinafter described.

In floating engagement with the gear 5 on one side of the plate 9, and with the gear 8 on the other side of said plate, between each pair of gears 13, is an idle pinion 15. Referring to Figs. 3 and 8, each of the pinions 15 has a short axial extension 16 which loosely enters an arcuate slot 17 provided in the disk plate 9. There are three of these slots 17, one between each pair of slots 14, for a purpose to be hereinafter described. (See Fig. 4.)

Secured to the casing section 2 by means of the studs 11 and nuts 12, is a bevel gear 18 which is adapted to be rotated by a driving gear (not shown) to turn the casing section 2. When said casing section is thus rotated, its companion section 1 will also be rotated, since the two sections are connected by the studs 11. Now when the two sections 1 and 2 are rotated, the studs 11 which connect them will carry the gears 13 around the gears 5 and 8 into mesh with the idle pinions 15. When the gears 13 and idle pinions 15 are thus in mesh, they are locked together against separate rotation for the purpose of thereafter turning the gears 5 and 8 to which the axle shafts 6 and 4 are respectively secured. Accordingly, a further rotation of the casing section 2 will cause the axle shafts 4 and 6 to turn as a unit to rotate the driving wheels of an automobile containing my differential mechanism. (See Fig 5.)

Let it now be supposed that said automobile is turning a corner. In such a case one of the rear wheels thereof will revolve faster than the other one. The difference in speed between the one wheel and the other, will cause the idle pinions 15 belonging to the faster rotating wheel to move out of engagement with their respective driving gears 13. This is due to the fact that the idle pinions 15 are not, like the gears 13, mounted on a common shaft. Hence, for example, when the gear 5 starts to move faster than the gear 8, it will carry its idle pinions 15 to the ends of their slots 17, where they will be out of engagement with their respective gears 13 to permit the device to act differentially. However, the pinions 15 of the faster moving wheel having been moved out of mesh with their respective gears 13, will permit the axle shaft of that wheel to rotate independent of the casing section which receives it, since said shaft is not rigidly secured to said casing section, but has its inner end journaled for a free movement therein.

While the outer wheel will always be permitted to rotate faster than the inner one to compensate for the difference in speed when turning a corner, it will not be permitted a reverse movement to strain the driving mechanism, since any reverse movement of said wheel will cause the idle pinions 15 to again lock with the driving gears 13 belonging to the outer wheel to retard a rearward movement of the latter.

My invention has the further advantage in that both sections of the split axle are positive drivers. For example, should one driving wheel of an automobile, on a straight course, encounter a slippery place and the other wheel be on dry ground, the machine will derive its traction from the wheel on dry ground, since my differential gear mechanism makes the axle sections practically one solid unit when the car is traveling a straight course. Accordingly, a car equipped with my differential gearing can better travel through mud, sand and snow than one which is retarded as soon as one driving wheel encounters a slippery place.

The tendency toward skidding, both when the automobile is traveling a straight course or turning a corner, is also considerably lessened by my improved differential gearing. On a curve, the inside wheel being the driving one, will have a tendency to prevent the machine from swerving to one side; and on a straight course, if one driving wheel should happen to leave the ground, the power will immediately be transmitted in full force to the other wheel, to prevent the machine from suddenly turning to one side.

I do not wish to be limited to the details of construction and arrangement herein shown and described, and any changes or modifications may be made therein within the scope of the subjoined claims.

Having described my invention, I claim:

1. A differential mechanism comprising a divided casing, a shaft journaled in each casing section, a gear fast on the inner end of each shaft, a partition separating said gears, members extending through said partition for connecting the casing sections together, gears mounted on said members, one on each side of said partition, for engagement with the first named gears, means for revolving the casing, and means for locking the second named gears on each side of said partition, against rotation on their respective members, whereby one or both shafts may be turned by the revolving casing.

2. A differential mechanism comprising a divided casing, a shaft journaled in each casing section, a gear fast on the inner end of each shaft, a partition separating said gears, elements extending through said partition for connecting the casing sections together, gears mounted on said elements, one on each side of said partition, for engagement with the first named gears, means for revolving the casing, and mobile means movable into engagement with the first and second named gears, on each side of said partition, to lock the second named gears against rotation on their respective elements, whereby one or both shafts may be turned by the revolving casing.

3. A differential mechanism comprising a divided casing, a shaft journaled in each casing section, a gear fast on the inner end of each shaft, a spider separating said gears, elements extending through said spider for connecting the casing sections together, gears loosely mounted on said elements, one on each side of said spider, for engagement with the first named gears, means for revolving the casing, and idle pinions movable into engagement with the first and second named gears on each side of said spider, to lock the second named gears against rotation on their respective elements, whereby one or both shafts may be turned by the revolving casing.

4. A differential mechanism comprising a divided casing, a shaft journaled in each casing section, a gear fast on the inner end of each shaft, a disk plate separating said gears, spindles extending through holes in said plate for connecting the casing sections together, gears loosely mounted on said spindles, one on each side of said plate, for engagement with the first named gears, means for revolving the casing, and idle pinions movable into engagement with the first and second named gears on each side of said plate, to lock the second named gears against rotation on their respective spindles, whereby one or both of said shafts may be turned by the revolving casing.

5. A differential mechanism comprising a divided casing, a shaft journaled in each casing section, a gear fast on the inner end of each shaft, a spider separating said gears, studs extending through said spider for connecting the casing sections together, gears loosely mounted on said studs, one on each side of said spider, for engagement with the first named gears, means for revolving the casing, idle pinions movable into engagement with the first and second named gears on each side of said spider, to lock the second named gears against rotation on their respective studs, whereby one or both shafts may be turned by the revolving casing, and an annular peripheral rim on said spider to maintain said idle pinions in loose engagement with the first named gears.

6. A differential mechanism comprising a divided casing, a shaft journaled in each casing section, a gear fast on the inner end of each shaft, a disk plate separating said gears, spindles extending through slots arcuate in shape provided in said plate, for connecting the casing sections together, gears loosely mounted on said spindles, one on each side of said plate, for engagement with the first named gears, means for revolving the casing, idle pinions movable into engagement with the first and second named gears on each side of said plate, to lock the second named gears against rotation on their respective spindles, and a peripheral rim on said disk plate to hold the idle pinions in loose engagement with the first named gears.

7. A differential mechanism comprising a divided casing, a shaft journaled in each casing section, a gear fast on the inner end of each shaft, a disk plate separating said gears, spindles extending through arcuate slots provided in said plate for connecting the casing sections together, gears loosely mounted on said spindles, one on each side of said plate, for engagement with the first named gears, means for revolving the casing, idle pinions movable into engagement with the first and second named gears, to lock the latter against rotation on their respective spindles, and hubs on said pinions movable in arcuate slots provided in said disk plate between the first named slots.

In testimony whereof I have hereunto set my hand this 7th day of July, 1917.

FREDERICK J. BAKER.

Witnesses:
Wm. M. Pettit,
H. S. Smith.